US009352771B2

(12) United States Patent  (10) Patent No.: US 9,352,771 B2
Kuramitsu  (45) Date of Patent: May 31, 2016

(54) ELECTRIC POWER STEERING CONTROL DEVICE

(71) Applicant: DENSO CORPORATION, Kariya, Aichi-pref. (JP)

(72) Inventor: Shuji Kuramitsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/596,992

(22) Filed: Jan. 14, 2015

(65) Prior Publication Data

US 2015/0203148 A1    Jul. 23, 2015

(30) Foreign Application Priority Data

Jan. 23, 2014 (JP) ................................. 2014-10510

(51) Int. Cl.
    *B62D 6/08*      (2006.01)
    *B62D 5/04*      (2006.01)
    *G06F 17/11*     (2006.01)

(52) U.S. Cl.
    CPC ............ *B62D 5/0463* (2013.01); *B62D 5/0481* (2013.01); *G06F 17/11* (2013.01)

(58) Field of Classification Search
    CPC .... B62D 5/0463; B62D 5/0481; G06F 17/00; G06F 17/11
    See application file for complete search history.

(56) References Cited

U.S. PATENT DOCUMENTS

| 7,540,351 B2 * | 6/2009 | Kataoka ............... B62D 5/0463 180/443 |
| 2008/0033613 A1 * | 2/2008 | Tamaizumi .......... B62D 5/0463 701/41 |
| 2012/0197493 A1 | 8/2012 | Fujimoto et al. |
| 2014/0032051 A1 * | 1/2014 | Ezoe ...................... B62D 6/001 701/42 |
| 2014/0303850 A1 | 10/2014 | Chai et al. |

FOREIGN PATENT DOCUMENTS

| JP | 2010-215047 | 9/2010 |
| JP | 2013-103664 | 5/2013 |
| JP | 2013-126822 | 6/2013 |
| JP | 2014-151653 | * 8/2014 |

OTHER PUBLICATIONS

Office Action (4 pages) dated Jan. 12, 2016, issued in corresponding Japanese Application No. 2014-010510 and English translation (4 pages).

* cited by examiner

*Primary Examiner* — Michael J Zanelli
(74) *Attorney, Agent, or Firm* — Nixon & Vanderhye P.C.

(57) ABSTRACT

An electric power steering control device for controlling an assist torque output by a motor includes: a steering wheel of a vehicle; a torsion bar between the steering wheel and a column shaft; a torque sensor that detects a steering torque; a turning device that converts a rotation motion of the column shaft into a reciprocating motion of a rack that turns a wheel of the vehicle; the motor; a motor rotation angle sensor that detects a rotation angle of the motor; a steering shaft load estimation unit that estimates a steering shaft load; and a basic assist control unit that calculates a basic assist torque command value. The steering shaft load estimation unit estimates the steering shaft load based on the steering torque, a steering angular velocity or a steering angle acceleration, and a previous value of the basic assist torque command value.

7 Claims, 10 Drawing Sheets

ELECTRIC POWER STEERING CONTROL DEVICE

CROSS REFERENCE TO RELATED APPLICATION

This application is based on Japanese Patent Application No. 2014-10510 filed on Jan. 23, 2014, the disclosure of which is incorporated herein by reference.

TECHNICAL FIELD

The present disclosure relates to an electric power steering control device.

BACKGROUND

Up to now, in an electric power steering system of a vehicle, a control device has been known which controls an assist torque output by a motor on the basis of information such as a steering torque.

For example, a device disclosed in JP-A-2013-126822 estimates an axial force to be applied to a steering shaft on the basis of detection values of a torque sensor that detects a steering torque, a current sensor that detects a real current flowing in the motor, and a motor rotation angle sensor that detects a rotation angular velocity of the motor. The estimated axial force is input to a motor control signal output unit, and a target assist value is changed on the basis of a determination result using the estimated axial force to improve a steering feeling.

In the device of JP-A-2013-126822, a detected value of a real motor current by the current sensor well reflects a real motor output, but has the potential to include a high frequency component such as sensor noise. Therefore, when the axial force to be applied to the steering axis is estimated on the basis of the detected value of the current sensor, the use of the estimated value including a high frequency component for calculation which is a basis of an assist control of the electric power steering system has a problem in reliability.

SUMMARY

It is an object of the present disclosure to provide an electric power steering control device that can estimate a steering axis load while avoiding an influence of noise.

According to an aspect of the present disclosure, an electric power steering control device controls an assist torque output by a motor and is disposed in an electric power steering system. The electric power steering control device includes: a steering wheel operated by a driver of a vehicle; a torsion bar that is connected between the steering wheel and a column shaft; a torque sensor that detects a steering torque based on a torsion angle of the torsion bar; a turning device that converts a rotation motion of the column shaft into a reciprocating motion of a rack that turns a wheel of the vehicle by a rack and pinion mechanism; the motor that generates the assist torque for assisting the rotation motion of the column shaft or a trust of the rack; a motor rotation angle sensor that detects a rotation angle of the motor; a steering shaft load estimation unit that estimates a steering shaft load, which is a load of steering provided by a steering wheel operation of the driver and an assist operation of the motor; and a basic assist control unit that calculates a basic assist torque command value, which is a basic value of an assist torque command value with respect to the motor. The steering shaft load estimation unit estimates the steering shaft load based on the steering torque detected by the torque sensor, a steering angular velocity or a steering angle acceleration, which is obtained by converting the motor rotation angle detected by the motor rotation angle sensor, and a previous value of the basic assist torque command value.

In the above device, because the detection value of the current sensor is not used unlike the related art of JP-A-2013-126822, an influence of the current sensor noise on the high frequency component can be avoided, and the reliability of the estimation of the steering shaft load can be improved.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, plural embodiments of the present disclosure will be described with reference to the accompanying drawings.

First Embodiment

An electric power steering control device according to a first embodiment of the present disclosure will be described with reference to FIGS. 1 to 6. The electric power steering control device is a device that controls an assist torque output by a motor in an electric power steering system for a vehicle, and is configured, for example, as an ECU (electronic control unit).

Figure 1:
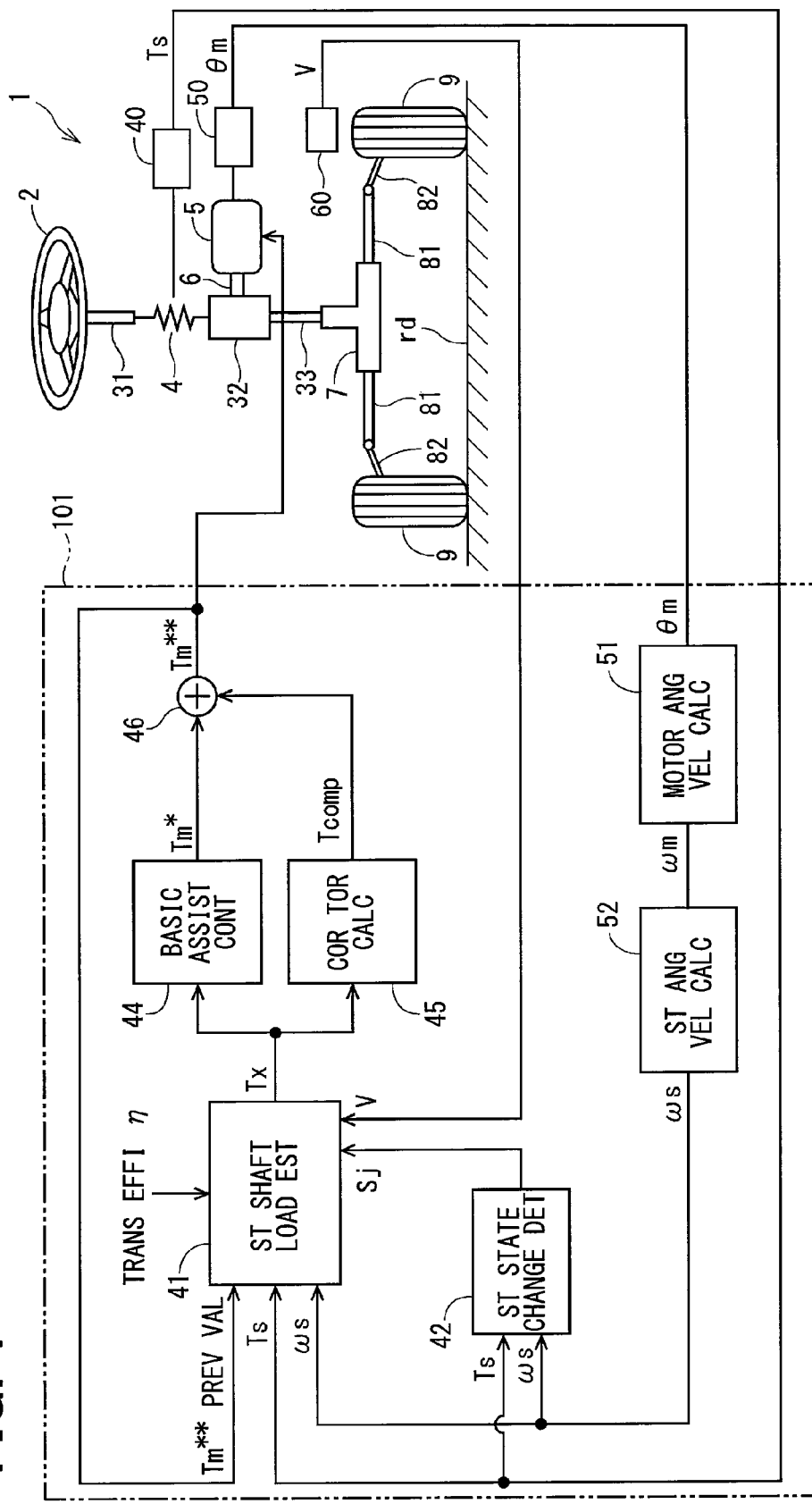
FIG. 1 is a schematic configuration diagram of an electric power steering control device according to a first embodiment of the present disclosure.

As illustrated in FIG. 1, an electric power steering control device 101 according to the first embodiment is applied to an electric power steering system 1 of a column assist type which assists the rotation of a column shaft 32 by an assist torque of a motor 5. The electric power steering system 1 includes a steering wheel 2, a steering shaft 31, the column shaft 32, an intermediate shaft 33, a torsion bar 4, the motor 5, a worm gear 6, a turning device 7, a torque sensor 40, and a motor rotation angle sensor 50.

The steering wheel 2 operated by the driver is coupled to one end of the steering shaft 31. The torque sensor 40 detects a torsion torque on the basis of a torsion angle of the torsion bar 4 connected between the other end of the steering shaft 31 and the column shaft 32. Hereinafter, the torsion torque detected by the torque sensor 40 is called "steering torque Ts".

The motor 5 is connected to the column shaft 32 through the worm gear 6 to generate an assist torque TM (refer to FIG. 2) that assists the rotation of the column shaft 32. The rotation of the column shaft 32 added with the assist torque TM is transmitted to the intermediate shaft 33 that couples the column shaft 32 with the turning device 7.

Also, the rotation angle θm of the motor 5 is detected by the motor rotation angle sensor 50.

The turning device 7 is configured by a rack and pinion mechanism including a pinion and a rack (refer to FIG. 3), and converts a rotational motion of the column shaft 32 which is transmitted through the intermediate shaft 33 into a rotational motion of the rack. Tie rods 81 are fitted to both ends of the rack of the turning device 7, and the rack as well as the tie rods 81 reciprocate in the right and left. Each of the tie rods 81 pulls or pushes a knuckle arm 82 attached to a tip of the tie rod 81 to turn wheels 9 abutted against a road surface rd.

Further, a vehicle velocity sensor 60 disposed on a given portion of the vehicle detects a vehicle velocity V.

The electric power steering control device 101 includes a steering shaft load estimation unit 41, a basic assist control unit 44, and a correction torque calculation unit 45 as configurations common to other embodiments which will be described later. Also, the electric power steering control device 101 includes a steering state change determination unit 42 as a configuration specific to the first embodiment.

Those configurations correspond to "steering shaft load estimation unit", "basic assist control unit", "correction torque calculation unit", and "steering state change determination unit," and is specifically configured by a microcomputer.

Also, in FIG. 1, a motor angular velocity calculation unit 51 and a steering angular velocity calculation unit 52 are included in an area (within a two-dot chain line box) of the electric power steering control device 101. The motor angular velocity calculation unit 51 differentiates a motor rotation angle θm detected by the motor rotation angle sensor 50 with time to calculate a motor angular velocity ωm. The steering angular velocity calculation unit 52 converts the motor angular velocity ωm into a steering angular velocity ωs which is an angle change of the steering shaft 31.

The motor angular velocity calculation unit 51 and the steering angular velocity calculation unit 52 may be disposed outside of the electric power steering control device 101, and the steering angular velocity ωs calculated externally may be input to the electric power steering control device 101.

First, the basic assist control unit 44 and the correction torque calculation unit 45 are general configurations provided in the related art electric power steering control device.

The related art basic assist control unit generally receives information such as the steering torque Ts detected by the torque sensor, the motor rotation angle θm detected by the motor rotation angle sensor, and the vehicle velocity V detected by the vehicle velocity sensor, and calculates "basic assist torque command value Tm*" which is a basic value of the assist torque command value to the motor 5 on the basis of those information.

On the contrary, the basic assist control unit 44 according to this embodiment does not receive the steering torque Ts and the steering angular velocity ωs directly, but receives those information as the estimate value of a steering shaft load Tx through the steering shaft load estimation unit 41.

Also, the correction torque calculation unit 45 calculates a correction torque Tcomp to the basic assist torque command value Tm* taking, for example, the turning or the returning operation of the steering wheel 2, or the convergence of the vehicle into account. In addition, a "corrected assist torque command value Tm**" in which the basic assist torque command value Tm* and the corrected torque Tcomp are added to each other by an adder 46 is commanded to the motor 5.

The assist torque calculation by the basic assist control unit 44 and the correction torque calculation unit 45 is repetitively executed when an ignition switch of the vehicle is on.

Then, the steering shaft load estimation unit 41 which is a characteristic configuration of the present disclosure estimates "steering shaft load Tx" that is a load of steering which is conducted by the steering operation of the driver and the assist of the motor 5. The estimation is performed on the basis of the steering torque Ts detected by the torque sensor 40, the steering angular velocity ωs input from the steering angular velocity calculation unit 52, and in the first embodiment, a previous value of the corrected assist torque command value Tm**. In this example, the "previous value" is a previous calculation value in the basic assist torque and corrected torque calculation which is repetitively executed, and it is conceivable that a previous value (value immediately before) is basically used, but two or more previous values may be used.

When the corrected assist torque command value Tm** is used, although there is a possibility that a high frequency component is mixed into the corrected torque Tcomp in a fifth embodiment which will be described later, there is advantageous in that information closer to a real behavior of the motor 5 can be obtained.

Figure 2:
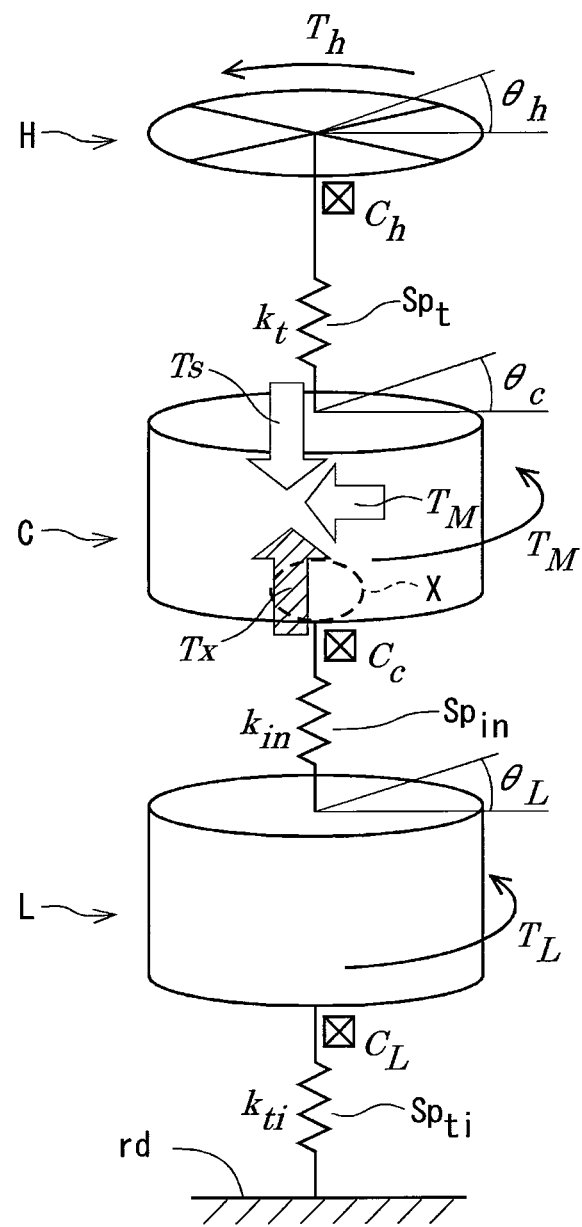
FIG. 2 is a model diagram of an electric power steering system.

Now, a description will be given of a theory for estimating the steering shaft load Tx on the basis of the previous values of the steering torque Ts, the steering angular velocity ωs, and the corrected assist torque command value Tm** with reference to FIG. 2 showing the electric power steering system. A model of FIG. 2 includes a steering portion H corresponding to the steering wheel 2, a column portion C corresponding to the column shaft 32, and a load portion L corresponding to a portion extending from the rack of the turning device 7 to the wheels 9.

The steering portion H and the column portion C are coupled with each other by a spring Spt corresponding to the torsion bar 4 of the torque sensor 40. The column portion C and the load portion L are coupled with each other by a spring Spin corresponding to the intermediate shaft 33. The load portion L and the road surface rd are coupled with each other by a spring Spti corresponding to tires of the wheels 9.

In the figure, a symbol T indicates a torque, k is a torsion spring constant, C is a viscous friction coefficient, and θ is a rotation angle, and subscripts "h", "c", and "L" of the symbols represent the amounts in the steering portion H, the column portion C, and the load portion L, respectively. TM indicates a motor torque, and corresponds to the basic assist torque command value Tm* or the corrected assist torque command value Tm** in the first embodiment.

In this model, motion equations in the respective portions are represented by Expressions (1.1) to (1.3). Symbol J indicates an inertia moment.

$$J_h \ddot{\theta}_h = -k_t(\theta_h - \theta_c) - C_h \dot{\theta}_h + T_h \quad (1.1)$$

$$J_c \ddot{\theta}_c = k_t(\theta_h - \theta_c) - C_c \dot{\theta}_c - k_{in}(\theta_c - \theta_L) + T_M \quad (1.2)$$

$$J_L \ddot{\theta}_L = k_{in}(\theta_c - \theta_L) - C_L \dot{\theta}_L + -k_{ti}\theta_L + T_L \quad (1.3)$$

Expression (1.2') is obtained by deforming Expression (1.2) of the column portion C.

$$k_{in}(\theta_c - \theta_L) + C_c \dot{\theta}_c = T_M + k_t(\theta_h - \theta_c) - J_c \ddot{\theta}_c \quad (1.2')$$

As illustrated in FIG. 2, the steering shaft load Tx is exerted on a portion X which is in the vicinity of a coupling portion of the column shaft 32 and the intermediate shaft 33, and is equal to a sum of the torque of the intermediate shaft 33 and the column rotation friction, that is, a left side of Expression (1.2').

Also, the steering torque Ts, that is, the torsion torque detected by the torque sensor 40 is represented by Expression (2).

$$Ts = kt(\theta h - \theta c) \quad (2)$$

Therefore, the steering shaft load Tx is represented by Expression (3).

$$\begin{aligned} Tx &= k_{in}(\theta_c - \theta_L) + C_c \dot{\theta}_c \\ &= T_M + k_t(\theta_h - \theta_c) - J_c \ddot{\theta}_c \\ &= T_M + Ts - J_c \ddot{\theta}_c \end{aligned} \quad (3)$$

A third term of a right side in Expression (3) can be calculated by differentiating the steering angular velocity ωs with time.

With the above description, the steering shaft load estimation unit 41 can estimate the steering shaft load Tx on the basis of the information on the previous values of the steering torque Ts, the steering angular velocity ωs, and the corrected assist torque command value Tm**.

If the third term of the right side in Expression (3) is ignored, it can be conceivable that the steering shaft load Tx balances with the sum of the steering torque Ts and the assist torque TM.

The steering shaft load estimation unit 41 according to this embodiment further variously corrects the estimate value of the steering shaft load Tx estimated as described above to improve estimate precision.

As one of the steering shaft load corrections, the steering shaft load estimation unit 41 performs correction taking "a change in the steering state" of the turning state and the returning state of the steering wheel 2 into account. As means for achieving the correction, the first embodiment includes the steering state change determination unit 42. The steering state change determination unit 42 receives the steering torque Ts and the steering angular velocity ωs, determines that the steering state has been changed on the basis of the change, and outputs a determination signal Sj to the steering shaft load estimation unit 41. The steering shaft load estimation unit 41 corrects the estimate value of the steering shaft load Tx on the basis of the determination signal Sj.

The "change in the steering state" particularly has a problem on "the characteristic change in the steering system" caused by backlash of a gear generated by a change from the turning operation to the returning operation, or a change from the returning operation to the turning operation. The backlash of the gear is generated in plural portions in a power transmission route extending from the motor 5 to the turning device 7. Now, a description will be given of a power relationship between a drive side and a non-drive side with the rack and pinion mechanism of the turning device 7 as an example with reference to FIGS. 3 and 4.

Figure 3:
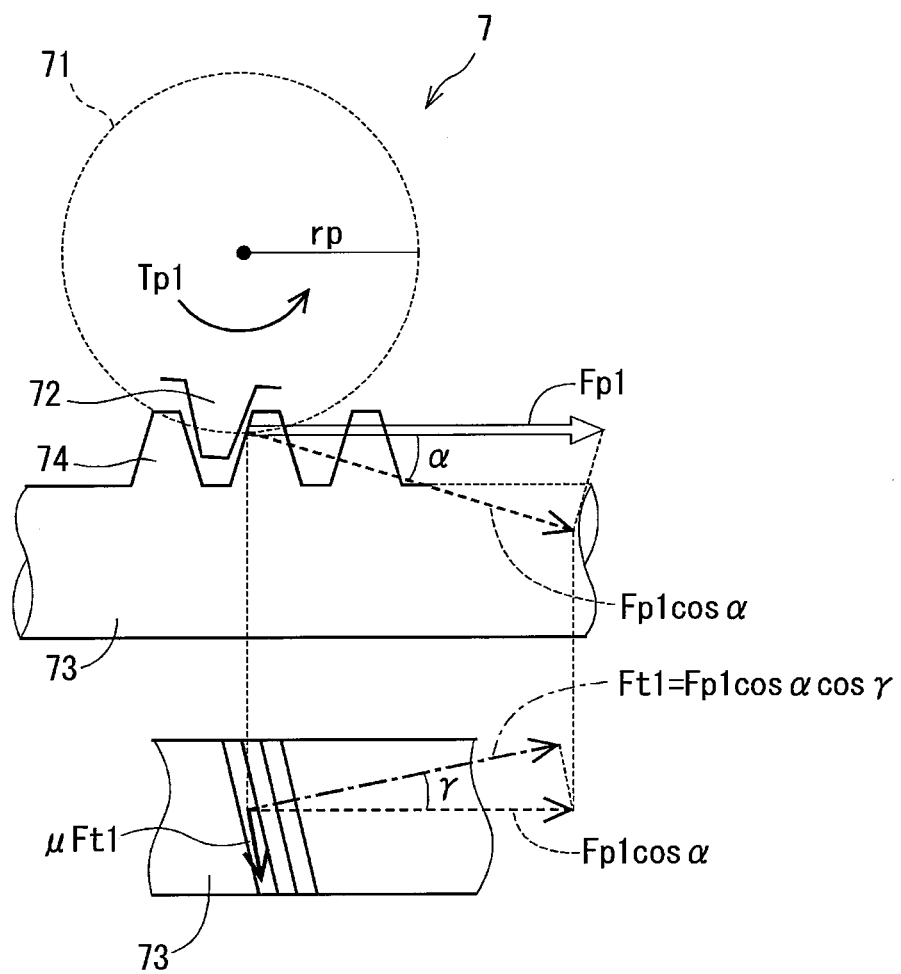
FIG. 3 is a schematic view of a rack and pinion mechanism.

As illustrated in FIG. 3, in the rack and pinion mechanism of the turning device 7, teeth 72 of a pinion 71 are meshed with teeth 74 of a rack 73. First, let us consider a case in which the rack 73 is driven by the torque of the pinion 71. This corresponds to the operation when turning the steering wheel 2.

In a case (I), "1" is added to ends of signs of a torque and a force, and a pinion torque is represented by Tp1, and a thrust for pushing the rack 73 in an axial direction by the pinion torque Tp1 is represented by Fp1. Also, it is assume that a radius of the pinion 71 is rp, a pressure angle of the rack teeth 74 is α, and a lead angle is γ.

A force Fp1 by which the pinion 71 pushes the rack 73 in the axial direction is represented by Expression (4.1).

$$Fp1 = Tp1/rp \quad (4.1)$$

A force Ft1 by which the force Fp1 pushes a tooth surface of the rack teeth 74 perpendicularly is represented by Expression (4.2).

$$Ft1 = Fp1 \cos \alpha \cos \gamma \quad (4.2)$$

A reference value Fr1_ref of the force by which the rack 73 is pushed in the axial direction by the force Ft1 is represented by Expression (4.3).

$$Fr1\_ref = Ft1 \cos \gamma \cos \alpha \quad (4.3)$$

Expression (4.4) is obtained by expanding Expression (4.3) by Expressions (4.1) and (4.2).

$$Fr1\_ref = (Tp1/rp)\cos 2\alpha \cos 2\gamma \quad (4.4)$$

Also, if it is assumed that a frictional force acting along a tooth surface sliding direction of the rack teeth 74 is represented by "μft1" assuming that the tooth surface friction coefficient is μ, and a component Fr1_frc of the frictional force μft1 in the axial direction of the rack 73 is represented by Expression (4.5).

$$\begin{aligned} Fr1\_frc &= \mu Ft1 \sin\gamma\cos\alpha \\ &= \mu(Tp1/rp)\cos 2\alpha \sin\gamma\cos\gamma \end{aligned} \quad (4.5)$$

With the above configuration, if the pinion 71 drives the rack 73, the rack thrust Fr1 against the pinion torque Tp1 is represented by Expression (5) through Expressions (4.4) and (4.5).

$$\begin{aligned} Fr1 &= Fr1\_ref - Fr1\_frc \\ &= (Tp1/rp) \times (\cos 2\alpha \cos 2\gamma - \mu\cos 2\alpha \sin\gamma\cos\gamma) \end{aligned} \quad (5)$$

Then, let us consider a case in which the pinion 71 rotates by a force in the axial direction of the rack 73. This corresponds to a case in which a direction of the wheels 9 is varied due to a step of the road surface rd, and the steering wheel 2 shakes, or a case in which a self-aligning torque for trying to return the direction of the wheels 9 to a straight direction of the vehicle due to a road surface reaction force acts when the turning operation of the steering wheel 2 stops.

In a case (II), "2" is added to ends of signs of the torque and the force, a thrust of the rack 73 in the axial direction is represented by Fr2, and a torque for rotating the pinion 71 by the rack thrust Fr2 is represented by Tp2. Also, the respective symbols employ the symbols of the above case (I).

The derivation of detailed expressions will be omitted, and if the rack 73 drives the pinion 71, the pinion torque Tp2 to the rack thrust Fr2 is expressed by Expression (6).

$$Tp2 = rp \times Fr2 \times (\cos 2\alpha \cos 2\gamma - \mu \cos 2\alpha \cos \gamma \sin \gamma) \quad (6)$$

Figure 4:
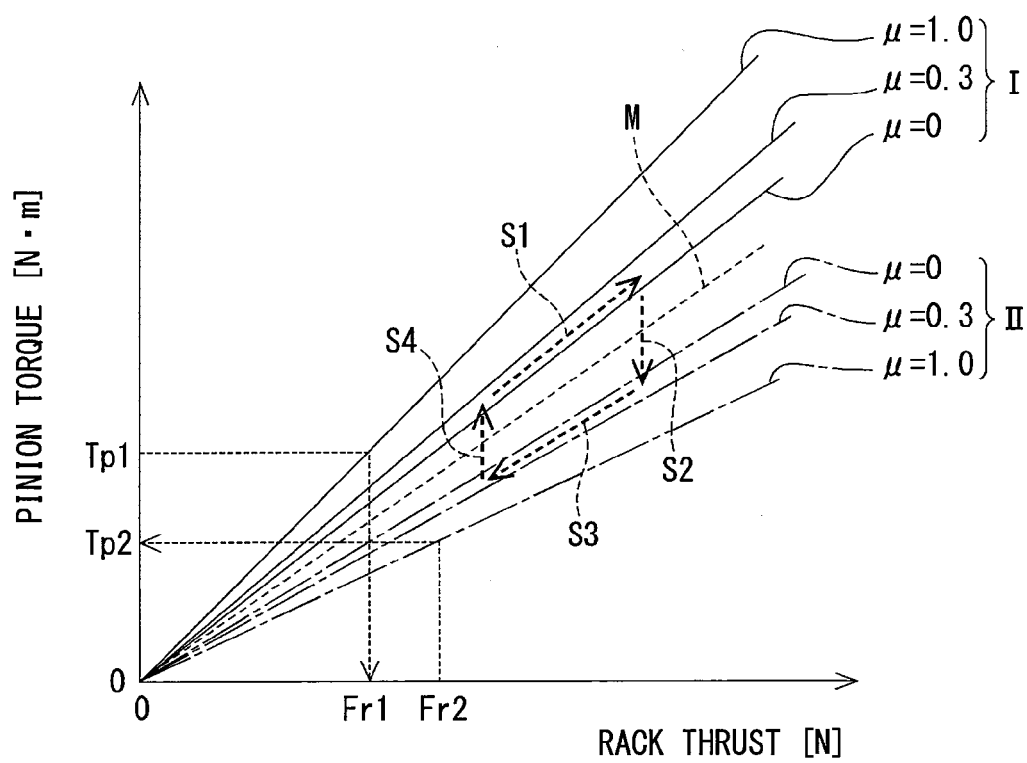
FIG. 4 is a graph illustrating a relationship between a pinion torque and a rack thrust in the rack and pinion mechanism.

FIG. 4 illustrates a graph in which given numeral values are incorporated into a radius rp, a pressure angle α, and the lead angle γ in Expressions (5) and (6), and a relationship between the rack thrust Fr and the pinion torque Tp is plotted with the tooth surface friction coefficient μ=0, 0.3, 1.0.

A characteristic line of the case (I) where the pinion 71 drives the rack 73, and a characteristic line of the case (II) where the rack 73 drives the pinion 71 have an inverted relationship with respect to a mirror line M. Both of those characteristic lines come closer to each other as the tooth surface friction coefficient μ is closer to 0, and the transmission efficiency is higher, but both of those characteristic lines have a tendency to be more apart away from each other as the tooth surface friction coefficient μ is closer to 1, and the transmission efficiency is lower.

With the "change in the steering state" caused by a shift from the turning operation to the returning operation during drive of the vehicle, the power transmission characteristics in the rack and pinion mechanism change according to the hysteresis characteristics of S1, S2, S3, and S4 in the stated order. Under the circumstances, there is a technical significance for correcting the estimate value of the steering shaft load Tx in consideration of the characteristic change of the steering system due to the backlash of such gear.

As an example of "characteristic change of the steering system" other than backlash, switches, etc. of a static friction and a dynamic friction in power transmission mechanism are conceivable.

Figure 5:
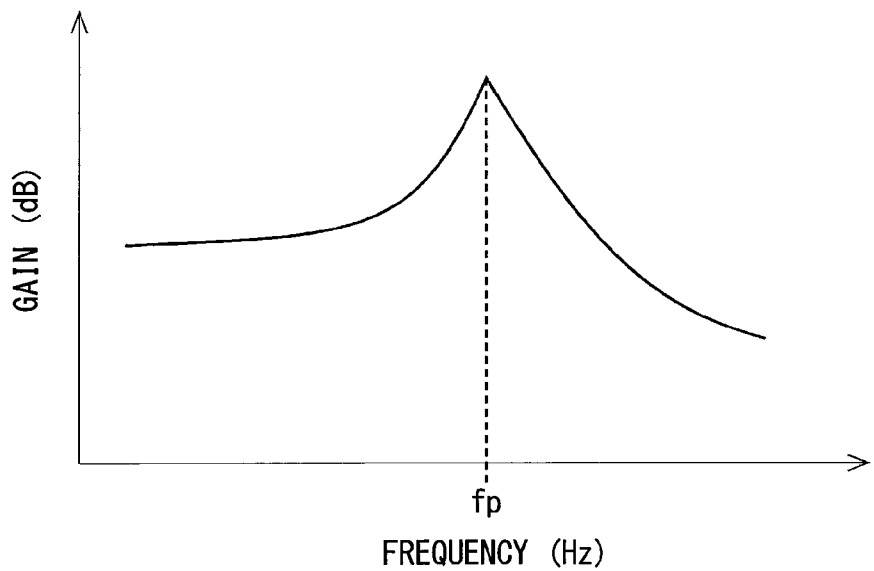
FIG. 5 is a diagram illustrating an example of a frequency characteristic of backlash.
Figure 6:
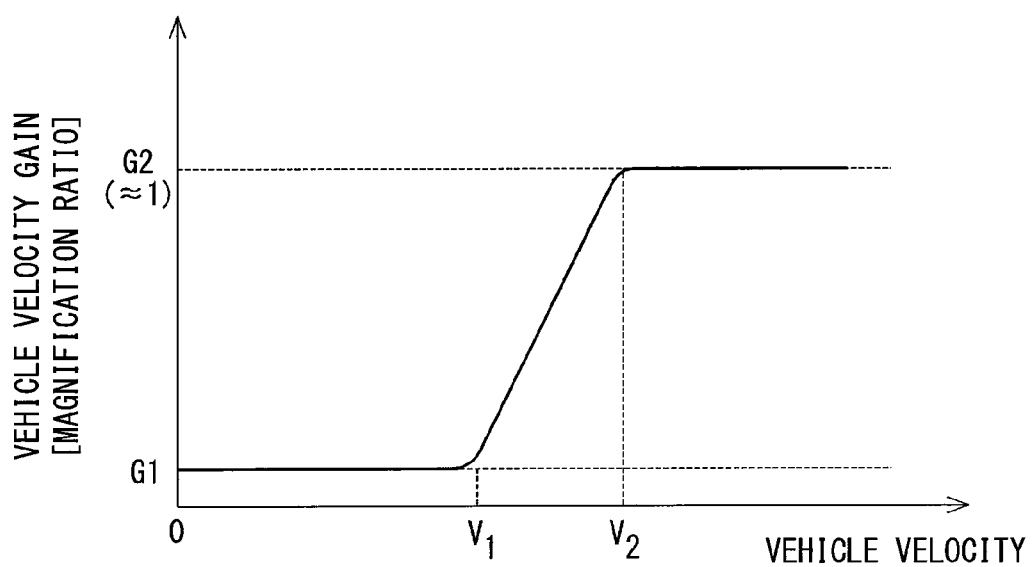
FIG. 6 is a map illustrating a relationship between a vehicle velocity and a gain correction value.

Furthermore, the "characteristic change of the steering system", and specifically, the estimate value of the steering shaft load Tx on the basis of the frequency characteristics as illustrated in FIG. 5 may be corrected. That is, in consideration of the peak frequency fp of the frequency characteristics exhibiting the phenomenon, it is preferable to perform an appropriate gain correction.

As described above, the steering shaft load estimation unit 41 corrects the estimate value of the steering shaft load Tx based on the "change in the steering state." In addition, the steering shaft load estimation unit 41 of this embodiment corrects the estimate value of the steering shaft load Tx based also on the transmission efficiency η of the power transmission mechanism for transmitting the output of the motor 5 to the rack 73. The power transmission mechanism includes, for example, the worm gear 6 between the motor 5 and the column shaft 32, the intermediate shaft 33, or the rack and pinion mechanism of the turning device 7.

In addition, the steering shaft load estimation unit 41 of this embodiment corrects the estimate value of the steering shaft load Tx on the basis of the vehicle velocity V detected by the vehicle velocity sensor 60. For example, as illustrated in the map in FIG. 6, a correction is made so that a relatively small velocity gain G1 is employed in an area where the vehicle velocity V is equal to or lower than V1, a relatively large velocity gain G2 (≈1) is employed in an area where the vehicle velocity V is higher than V2, and the vehicle velocity gain changes according to the vehicle velocity V between G1 and G2 in an area where the vehicle velocity V is from V1 to V2.

Advantageous Effects

The advantageous effects of the electric power steering control device 101 according to this embodiment will be described.

(1) The steering shaft load estimation unit 41 estimates the steering shaft load Tx on the basis of the previous value of the corrected assist torque command value Tm** in addition to the steering torque Ts and the steering angular velocity ωs. Because the detection value of the current sensor is not used unlike the related art of JP-A-2013-126822, an influence of the high frequency component caused by the current sensor noise can be avoided, and the reliability of the estimation of the steering shaft load Tx can be improved.

(2) The steering shaft load estimation unit 41 according to this embodiment corrects the estimate value of the steering shaft load Tx based on the "change in the steering state" of the turning operation and the returning operation of the steering wheel 2. The related art of JP-A-2013-126822 does not consider the change in the steering state whereas the present disclosure considers the change in the steering state, thereby being capable of appropriately correcting the estimate value of the steering shaft load Tx.

Also, in this embodiment, because the basic assist control unit 44 calculates the basic assist torque command value Tm* on the basis of the estimate value of the steering shaft load Tx, the driver steering feeling can be improved by using the appropriate estimate value for the assist control.

(3) This embodiment includes the steering state change determination unit 42 as a specific means to find the "change in the steering state". With the above configuration, the change in the steering torque Ts and the steering angular velocity ωs with the transition between the turning operation and the returning operation of the steering wheel 2 makes it possible to appropriately find out the "change in the steering state".

(4) The steering shaft load estimation unit 41 according to this embodiment further corrects the estimate value of the steering shaft load Tx on the basis of the transmission efficiency η of the power transmission mechanism, and the vehicle velocity V. With the above configuration, the estimate value of the steering shaft load Tx can be corrected with higher precision.

Second Embodiment

Figure 7:
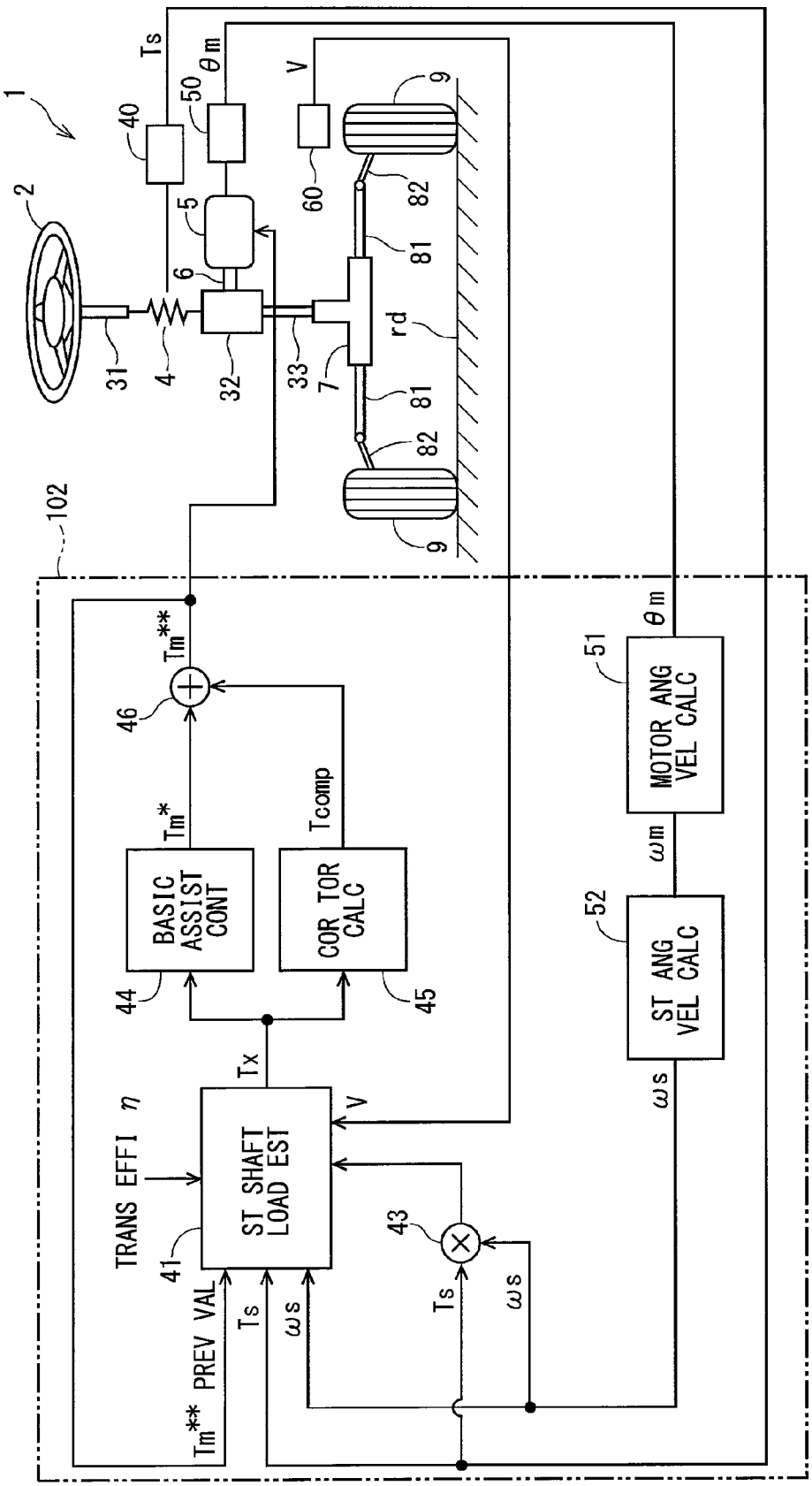
FIG. 7 is a schematic configuration diagram of an electric power steering control device according to a second embodiment of the present disclosure.

An electric power steering control device according to a second embodiment will be described with reference to FIG. 7. In the description of the following embodiments, substantially the same configurations as those in the above embodiment are denoted by identical symbols, and repetitive description will be omitted.

An electric power steering control device 102 according to a second embodiment includes a multiplier 43 that calculates a product of a steering torque Ts acquired from a torque sensor 40, and a steering angular velocity ωs acquired from a steering angular velocity calculation unit 52 instead of the steering state change determination unit 42 of the first embodiment. Because a value of the product changes when at least one of the steering torque Ts and the steering angular velocity ωs changes, a change in the steering state can be found out.

The steering shaft load estimation unit 41 estimates the change in the steering state with the use of a map or the like on the basis of the value output by the multiplier 43, and corrects the estimate value of the steering shaft load Tx.

The second embodiment obtains the same advantageous effects (1) to (4) of the first embodiment.

Third to Sixth Embodiments

Figure 10:
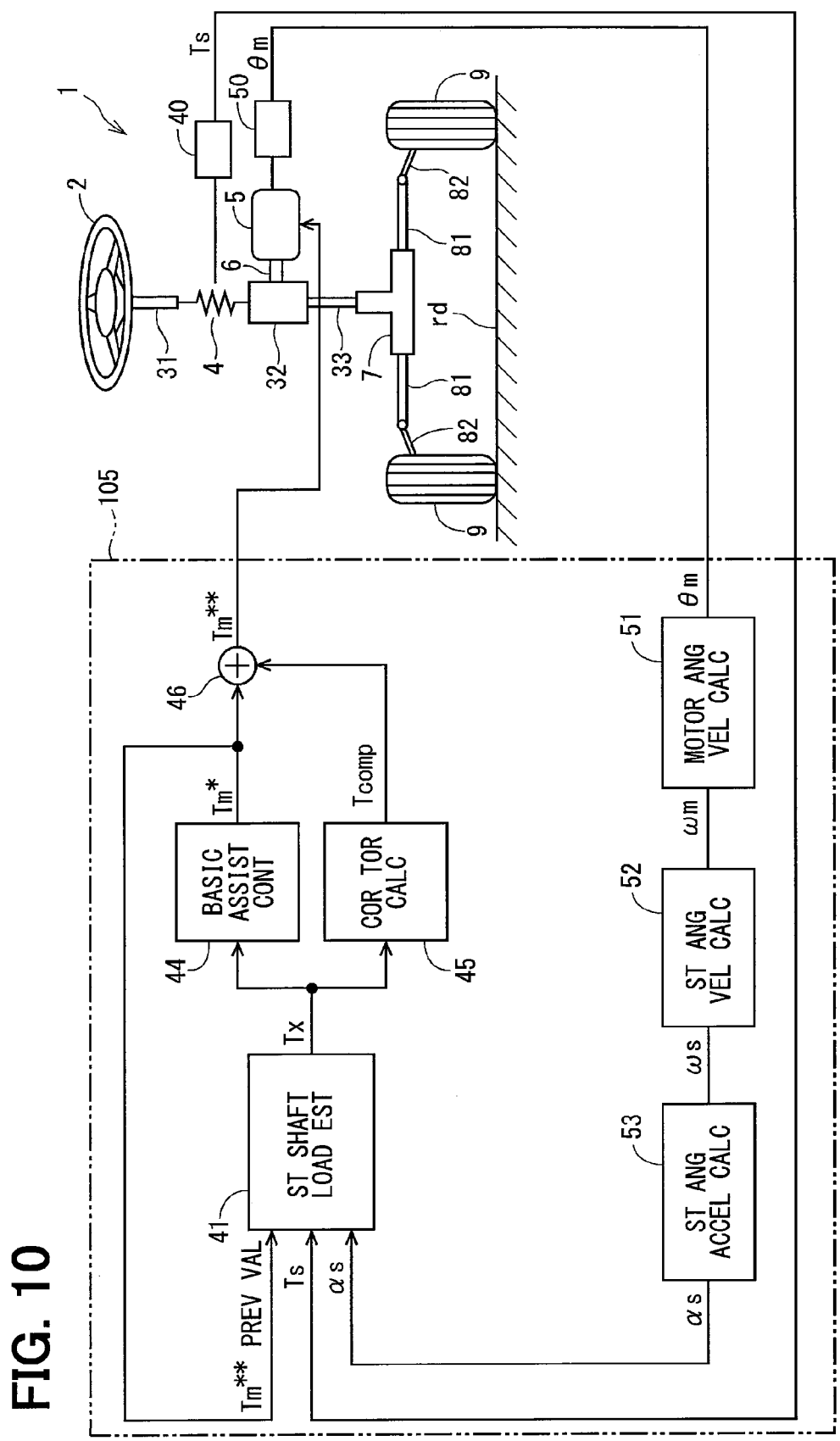
FIG. 10 is a schematic configuration diagram of an electric power steering control device according to a fifth embodiment of the present disclosure.
Figure 11:
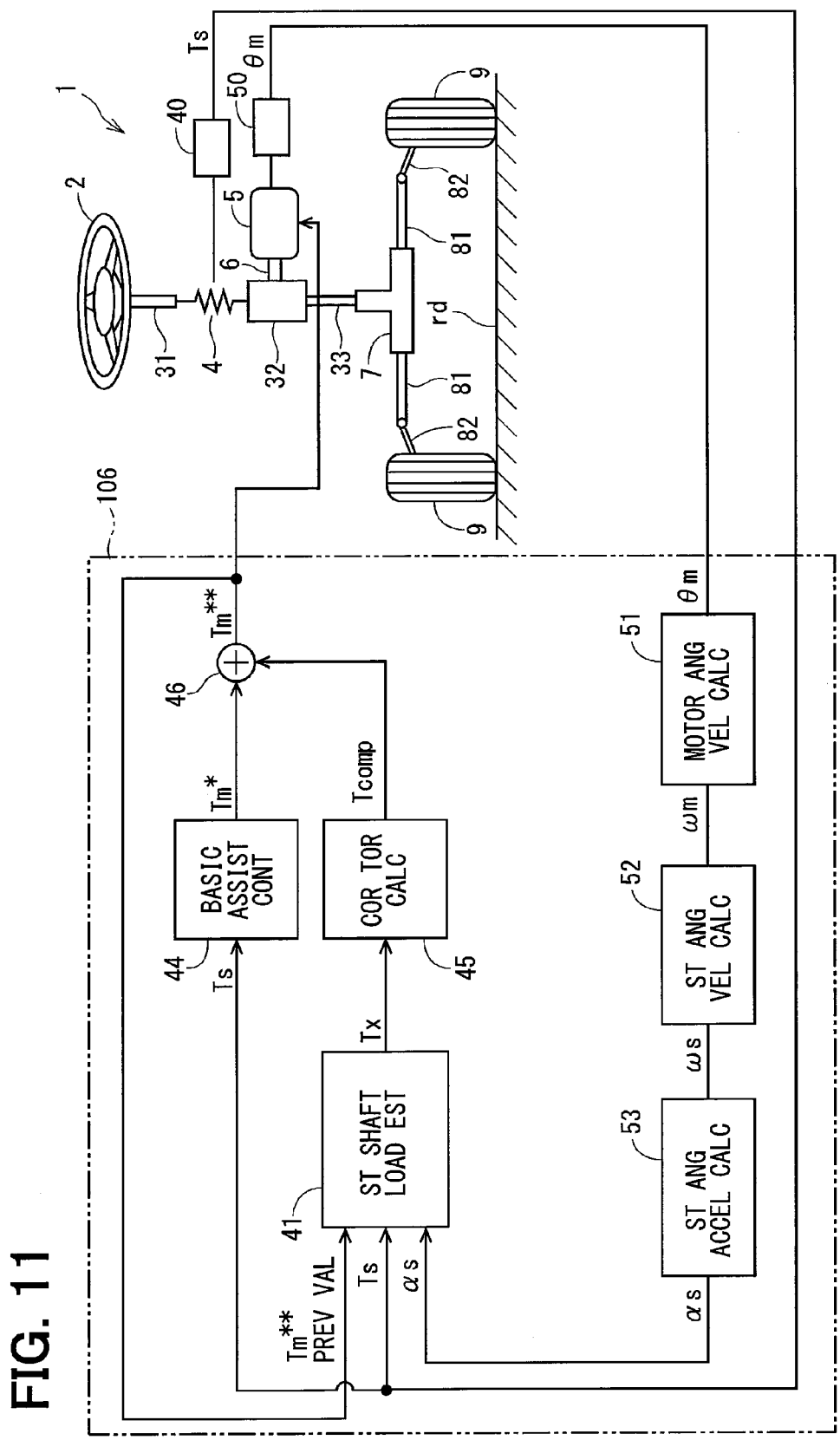
FIG. 11 is a schematic configuration diagram of an electric power steering control device according to a sixth embodiment of the present disclosure.

An electric power steering control device according to third to sixth embodiments will be described with reference to FIGS. 8 to 11. The third to sixth embodiments have no configuration in which the estimate value of the steering shaft load Tx is corrected on the basis of a change in the steering state in a steering shaft load estimation unit 41 as in the first and second embodiments. The steering shaft load estimation unit 41 corrects the estimate value of the steering shaft load Tx on the basis of the transmission efficiency η, or the vehicle speed V (FIGS. 8 and 9), or outputs the estimate value without correcting the estimate value (FIGS. 10 and 11).

Also, in the third to fifth embodiments, the steering torque Ts of the three values used by steering shaft load estimation unit 41 as a basis for estimation of the steering shaft load Tx is common, and another or two values are different.

Figure 8:
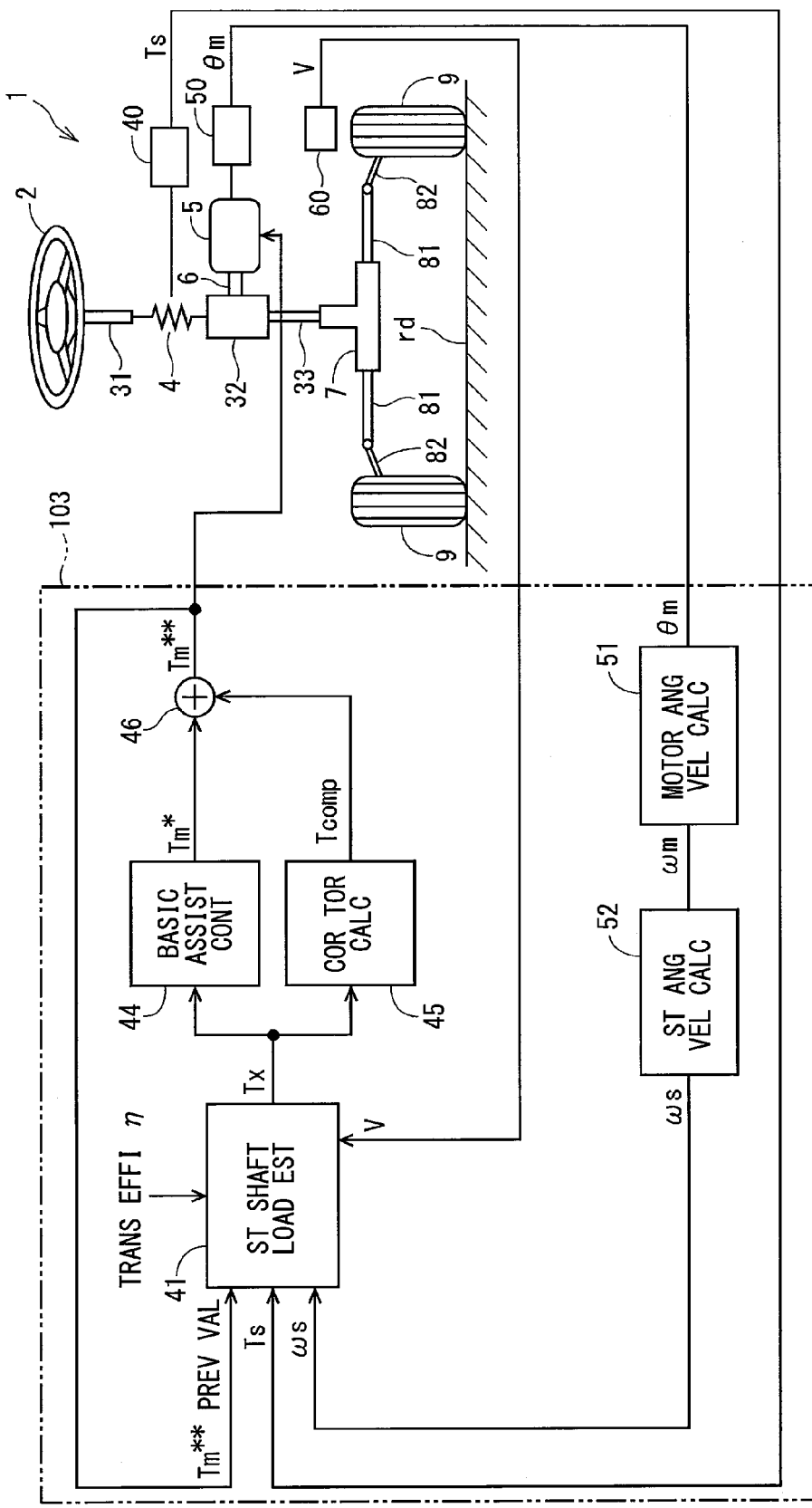
FIG. 8 is a schematic configuration diagram of an electric power steering control device according to a third embodiment of the present disclosure.

In an electric power steering control device 103 according to a third embodiment illustrated in FIG. 8, the steering shaft load estimation unit 41 estimates the steering shaft load Tx on the basis of the steering torque Ts, the steering angular velocity ωs, and "the previous values of the corrected assist torque command value Tm**" as in the first and second embodiments.

Figure 9:
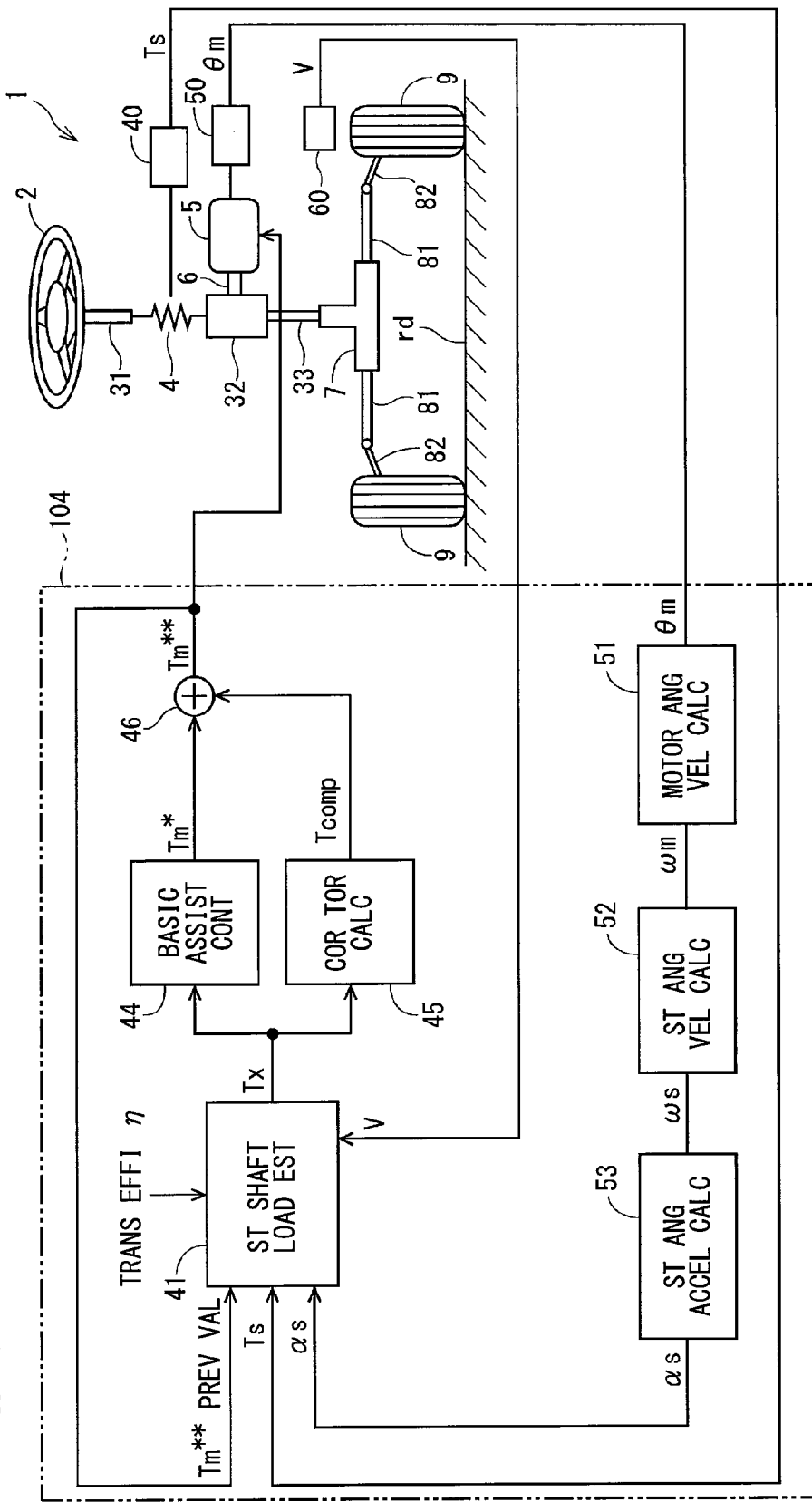
FIG. 9 is a schematic configuration diagram of an electric power steering control device according to a fourth embodiment of the present disclosure.

On the contrary, an electric power steering control device 104 according to a fourth embodiment illustrated in FIG. 9 includes a steering angle acceleration calculation unit 53 for differentiating the steering angular velocity ωs calculated by the steering angular velocity calculation unit 52 with time, and the steering shaft load estimation unit 41 estimates the steering shaft load Tx on the basis of the steering angle acceleration αs instead of the steering angular velocity ωs, The steering angle acceleration calculation unit 53 is not also limited to a configuration included in an area of the electric power steering control device 104, but may be disposed outside of the electric power steering control device 104.

If the steering angular velocity ωs is input to the steering shaft load estimation unit 41 as described above, for example, the internal steering angular velocity ωs is differentiated within the steering shaft load estimation unit 41, to thereby calculate a third term of Expression (3), that is, "the second derivative term of θc". In contrast, as in this embodiment, the steering shaft load estimation unit 41 receives the steering angle acceleration αs differentiated by the external steering angle acceleration calculation unit 53, and can use the steering angle acceleration αs for calculation as it is.

Also, in an electric power steering control device 105 according to a fifth embodiment illustrated in FIG. 10, the steering shaft load estimation unit 41 estimates the estimate value of the steering shaft load Tx on the basis of "the previous value of the basic assist torque command value Tm*", that is, a value before being added with a corrected torque Tcomp by an adder 46, in addition to the steering torque Ts and the steering angle acceleration αs. The interpretation of "previous value" is identical with that of the corrected assist torque command value Tm**.

Since the basic assist torque command value Tm* is a calculated value per se of the basic assist control unit 44 although the basic assist torque command value Tm* has a tendency to hardly reflect the real behavior of the motor 5 as compared with the corrected assist torque command value Tm**, there is advantageous in that a fluctuation of the basic assist torque command value Tm* due to the high frequency component is suppressed.

In addition, from the viewpoint of information acquired by the steering shaft load estimation unit 41, no correction torque calculation unit 45 may be provided in this embodiment.

Finally, an electric power steering control device 106 according to a sixth embodiment illustrated in FIG. 11 is different from that of the first to fifth embodiments in that the estimate value of the steering shaft load Tx estimated by the steering shaft load estimation unit 41 is not input to the basic assist control unit 44, but is input to only the correction torque calculation unit 45.

In this case, the basic assist control unit 44 calculates a basic assist torque command value Tm* on the basis of the steering torque Ts which is acquired from the torque sensor 40. An estimate value of the steering shaft load Tx is subjected to the corrected torque Tcomp by the correction torque calculation unit 45, and then used for the assist control.

In addition, in the other embodiments described above, the estimate value of the steering shaft load Tx may be input to only the correction torque calculation unit 45.

All of the above third to sixth embodiments share the advantageous effects (1) of the first embodiment. The influence of the high frequency component caused by the current sensor noise can be avoided, and the reliability of the estimation of the steering shaft load Tx can be improved.

In the configuration of correcting the estimate value of the steering shaft load Tx on the basis of at least one of the transmission efficiency η and the vehicle velocity V of the power transmission mechanism, this embodiment shares the advantageous effect (4) with the first embodiment.

Other Embodiments

The electric power steering control device according to the above embodiment is configured, for example, as an ECU. However, this does not mean that the electric power steering control device is physically formed by a sheet or one set of electronic board. For example, the steering shaft load estimation unit 41, the basic assist control unit 44, and the other parts may be provided to physically separate from each other, and communicate with each other by harness.

The electric power steering control device according to the embodiments is applied to an electric power steering system of a column assist type which assists the rotation of a column shaft by an assist torque of the motor. In addition, an electric power steering control device according to the present disclosure may be applied to an electric power steering system of a rack assist type which assists the rack thrust by an assist torque of the motor.

The above disclosure has the following aspects.

According to an aspect of the present disclosure, an electric power steering control device controls an assist torque output by a motor and is disposed in an electric power steering system. The electric power steering control device includes: a steering wheel operated by a driver of a vehicle; a torsion bar that is connected between the steering wheel and a column shaft; a torque sensor that detects a steering torque based on a torsion angle of the torsion bar; a turning device that converts a rotation motion of the column shaft into a reciprocating motion of a rack that turns a wheel of the vehicle by a rack and pinion mechanism; the motor that generates the assist torque for assisting the rotation motion of the column shaft or a trust of the rack; a motor rotation angle sensor that detects a rotation angle of the motor; a steering shaft load estimation unit that estimates a steering shaft load, which is a load of steering provided by a steering wheel operation of the driver and an assist operation of the motor; and a basic assist control unit that calculates a basic assist torque command value, which is a basic value of an assist torque command value with respect to the motor. The steering shaft load estimation unit estimates the steering shaft load based on the steering torque detected by the torque sensor, a steering angular velocity or a steering angle acceleration, which is obtained by converting the motor rotation angle detected by the motor rotation angle sensor, and a previous value of the basic assist torque command value.

In the above case, the "previous value" is a previously calculated value in the basic assist torque calculation repetitively executed, and is not limited to one previous value (immediately prior value), but includes two or more previous values.

In the above device, the steering shaft load estimation unit is provided to estimate the steering shaft load on the basis of the previous value of the basic assist torque command value, or the previous value of the corrected assist torque command value in addition to the steering torque, and the steering angular velocity or the steering angle acceleration. Because the detection value of the current sensor is not used unlike the related art of JP-A-2013-126822, an influence of the current sensor noise on the high frequency component can be avoided, and the reliability of the estimation of the steering shaft load can be improved.

Alternatively, the electric power steering control device may further include: a correction torque calculation unit that calculates a correction torque of the basic assist torque command value. The correction torque calculation unit commands a corrected assist torque command value obtained by adding the basic assist torque command value to the correction torque to the motor. The steering shaft load estimation unit estimates the steering shaft load based on the previous value of the corrected assist torque command value instead of the previous value of the basic assist torque command value, the steering torque, and the steering angular velocity or the steering angle acceleration.

In the above case, the steering shaft load estimation unit may estimate the steering shaft load on the basis of the previous value of the corrected assist torque command value instead of the previous value of the basic assist torque command value in addition to the steering torque, and the steering angular velocity or the steering angle acceleration. The interpretation of "previous value" is identical with that of the basic assist torque command value.

Alternatively, the steering shaft load estimation unit may correct an estimated steering shaft load based on a steering state change between a turning operation and a returning operation of the steering wheel.

The related art of JP-A-2013-126822 does not consider the change in the steering state whereas the present disclosure considers the change in the steering state, thereby being capable of appropriately correcting the estimate value of the steering shaft load.

Also, the estimate value corrected taking the change in the steering state into account is used for the assist control, thereby being capable of improving the steering feeling of the driver.

Further, the electric power steering control device may further include: a steering state change determination unit that determines the steering state change based on the steering torque and the steering angular velocity. The steering shaft load estimation unit corrects the estimated steering shaft load based on a determination signal from the steering state change determination unit.

Alternatively, the steering shaft load estimation unit may correct the estimated steering shaft load based on a product value of the steering torque and the steering angular velocity.

As a specific example of the "change in the steering state", there is a "characteristic change in a steering system" such as a backlash of a gear which is caused by a change from the turning operation of the steering wheel to the returning operation, or a change from the returning operation to the turning operation. In this case, the steering shaft load estimation unit may correct the estimate value of the steering shaft load on the basis of the frequency characteristic. Alternatively, the steering shaft load estimation unit may correct the estimated steering shaft load based on a characteristic change of the electric power steering system caused by the steering state change from the turning operation of the steering wheel to the returning operation of the steering wheel, or the steering state change from the returning operation of the steering wheel to the turning operation of the steering wheel. Further, the steering shaft load estimation unit may correct the estimated steering shaft load based on a frequency characteristic with respect to the characteristic change of the electric power steering system.

Alternatively, the steering shaft load estimation unit may correct the estimated steering shaft load based on a transmission efficiency of a power transmission mechanism that transmits an output of the motor to the rack. With the above configuration, the estimate value of the steering shaft load can be corrected with higher precision.

Alternatively, the steering shaft load estimation unit may correct the estimated steering shaft load based on a velocity of the vehicle. With the above configuration, the estimate value of the steering shaft load can be corrected with higher precision.

Alternatively, the basic assist control unit may calculate the basic assist torque command value based on the estimated steering shaft load estimated by the steering shaft load estimation unit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electric power steering control device that controls an assist torque output by a motor and is disposed in an electric power steering system, the electric power steering control device comprising:
   a steering wheel operated by a driver of a vehicle;
   a torsion bar that is connected between the steering wheel and a column shaft;
   a torque sensor that detects a steering torque based on a torsion angle of the torsion bar;
   a turning device configured by a rack and pinion mechanism that converts a rotation motion of the column shaft into a reciprocating motion of a rack that turns a wheel of the vehicle;
   the motor that generates the assist torque for assisting the rotation motion of the column shaft or a thrust of the rack;

a motor rotation angle sensor that detects a rotation angle of the motor; and a computer configured to perform at least, a steering shaft load estimation that estimates a steering shaft load, which is a load of steering provided by a steering wheel operation of the driver and an assist operation of the motor; and a basic assist control that calculates a basic assist torque command value, which is a basic value of an assist torque command value with respect to the motor, wherein the steering shaft load estimation estimates the steering shaft load based on the steering torque detected by the torque sensor, a steering angular velocity or a steering angle acceleration, which is obtained by converting the motor rotation angle detected by the motor rotation angle sensor, and a previous value of the basic assist torque command value, wherein the steering shaft load estimation corrects an estimated steering shaft load based on a product value of the steering torque and the steering angular velocity, which is a steering state change between a turning operation and a returning operation of the steering wheel.

2. The electric power steering control device according to claim 1, wherein the computer system is further configured to perform at least:

a correction torque calculation that calculates a correction torque of the basic assist torque command value, wherein the correction torque calculation commands a corrected assist torque command value obtained by adding the basic assist torque command value to the correction torque to the motor, and wherein the steering shaft load estimation estimates the steering shaft load based on the previous value of the corrected assist torque command value instead of the previous value of the basic assist torque command value, the steering torque, and the steering angular velocity or the steering angle acceleration.

3. The electric power steering control device according to claim 1, wherein the steering shaft load estimation corrects the estimated steering shaft load based on a characteristic change of the electric power steering system caused by the steering state change from the turning operation of the steering wheel to the returning operation of the steering wheel, or the steering state change from the returning operation of the steering wheel to the turning operation of the steering wheel.

4. The electric power steering control device according to claim 3, wherein the steering shaft load estimation corrects the estimated steering shaft load based on a frequency characteristic with respect to the characteristic change of the electric power steering system.

5. The electric power steering control device according to claim 1, wherein the steering shaft load estimation corrects the estimated steering shaft load based on a transmission efficiency of a power transmission mechanism that transmits an output of the motor to the rack.

6. The electric power steering control device according to claim 1, wherein the steering shaft load estimation corrects the estimated steering shaft load based on a velocity of the vehicle.

7. The electric power steering control device according to claim 1, wherein the basic assist control calculates the basic assist torque command value based on the estimated steering shaft load estimated by the steering shaft load estimation.

* * * * *